United States Patent [19]
Yamazaki et al.

[11] Patent Number: 5,755,998
[45] Date of Patent: May 26, 1998

[54] FLUOROPHOSPHATE FLUORESCENT GLASS CAPABLE OF EXHIBITING FLUORESCENCE IN THE VISIBLE REGION

[75] Inventors: Masaaki Yamazaki; Masaaki Otsuka; Shinobu Nagahama; Naruhito Sawanobori, all of Urawa, Japan

[73] Assignee: Sumita Optical Glass, Inc., Saitama-ken, Japan

[21] Appl. No.: 754,274

[22] Filed: Nov. 20, 1996

[30] Foreign Application Priority Data

Nov. 21, 1995 [JP] Japan ................................ 7-302892
Apr. 8, 1996 [JP] Japan ................................ 8-085096

[51] Int. Cl.$^6$ ............................ C03C 3/247; C03C 3/24; C03C 4/12
[52] U.S. Cl. .................... 252/301.4 P; 501/44; 501/45; 501/48; 501/41
[58] Field of Search ............... 252/301.4 H, 301.4 P; 501/44, 45, 48, 41

[56] References Cited

FOREIGN PATENT DOCUMENTS

| | | |
|---|---|---|
| 0074585 | 3/1983 | European Pat. Off. . |
| 0709345 | 5/1996 | European Pat. Off. . |
| 8-133780 | 5/1996 | Japan . |

OTHER PUBLICATIONS

Brundage et al., "Homogeneous Linewidth Of The $^5D_0$–$^7F_0$ Transition Of Trivalent Europium In A Fluorophosphate Glass", *Physical Review B (Condensed Matter)*, vol. 53, No. 14, pp. R8821–R8823 (Apr. 1, 1996).

Dmitryuk et al., "Spectroscopy Of Electron Phototransfer In Europium–Doped Phosphate Glasses", *Glass Physics and Chemistry*, vol. 19, No. 1, pp. 16–18 (1993).

Database WPI, Section Ch, Week 7514, Derwent Publications Ltd., London, GB, Class L01, AN 75-23099W, XP002025049 & JP-A-49 099 609 (Santoku Metal Industry), Sep. 20, 1974 *abstract*.

Tanabe et al., "Upconversion Properties, Multiphonon Relaxation, And Local Environment of Rare–Earth Ions In Fluorophospate Glasses", *Physical Review B (Condensed Matter)*, vol. 45, No. 9, pp. 4620–4625 (Mar. 1, 1992).

Brundage et al., "Homogenous Linewidth of the $^5D_0$–$^7F_0$ Transition of Europium in a Fluorophospate Glass", Apr. 1, 1996.

*Primary Examiner*—Melissa Bonner
*Attorney, Agent, or Firm*—Wenderoth, Lind & Ponack

[57] ABSTRACT

According to the present invention, there is provided a fluorophosphate fluorescent glass, capable of converting invisible ultraviolet rays into visually observable visible rays with a high efficiency and available for controlling the optical axis of a laser beam such as excimer laser, etc. The feature of this fluorescent glass consists in a fluorophosphate fluorescent glass capable of exhibiting fluorescence in the visible region, having a chemical composition comprising, at least, (I) phosphorus (P), oxygen (O) and fluorine (F), as glass constituting components, and (II) at least one member selected from the group consisting of divalent europium, terbium, samarium and manganese, as a fluorescent agent, the divalent europium being contained as an essential component and at least one of samarium and manganese being contained as an essential component when terbium is contained. In particular, a fluorophosphate fluorescent glass exhibiting a blue fluorescence containing europium as an essential component and a fluorophosphate fluorescent glass exhibiting a white fluorescence containing at least one of samarium and manganese as an essential component are provided.

8 Claims, 2 Drawing Sheets

FLUOROPHOSPHATE FLUORESCENT GLASS CAPABLE OF EXHIBITING FLUORESCENCE IN THE VISIBLE REGION

BACKGROUND OF THE INVENTION

1. Field of the Invention

This invention relates to a fluorophosphate fluorescent glass exhibiting a visible fluorescence and more particularly, it is concerned with a fluorophosphate fluorescent glass exhibiting a blue fluorescence, which is capable of converting invisible ultraviolet rays into visually observable visible rays with a high efficiency and available for controlling the optical axis of a laser beam such as excimer laser, etc. and applicable to fluorescent displaying of full color in combination with a green or red fluorescent glass, or a fluorophosphate fluorescent glass exhibiting white fluorescence, which can be utilized for displaying devices and backlights of LCD.

2. Description of the Prior Art

Phosphors using rare earth elements have widely been used up to the present time, mainly, as phosphors for lamps, color picture tubes, etc. Of late, materials for the anti-Stokes-wise wavelength conversion of infrared light into visible light have extensively been studied, for example, as to application to laser materials.

Trivalent Eu ion showing a fluorescence with a narrow spectrum width in the red region has been put to practice as color picture tubes, high color rendering fluorescent lamps, etc. Divalent Eu ion obtained by reducing trivalent Eu ion, capable of exhibiting various fluorescences depending on materials, has been put to practical use as the materials for X-ray intensifying screen, high color rendering fluorescent lamps, etc.

Tb ion exhibiting green fluorescence and Mn ion exhibiting red fluorescence have been put to practical use as materials for color picture tubes, high color rendering fluorescent lamps, etc. As described above, phosphors using Tb, Eu and Mn have already been put to practical use, but such a phosphor is an opaque material which is obtained by coating a suitable carrier with a powdered phosphor to thus give only a superficial emission.

As such a glass utilizing fluorescence of divalent Eu, there have hitherto been proposed those disclosed in Japanese Patent Publication No. 99609/1974 and a glass utilizing fluorescence of trivalent Eu has already been proposed by the inventors (Japanese Patent Application No. 266759/1994).

In the glasses described therein, however, the phosphors exhibit weak emission and look violet or red, not blue.

Eu is ordinarily present in trivalent state and exhibits red fluorescence by irradiation of ultraviolet rays. Thus, it is necessary to reduce Eu to divalent. Since divalent Eu exhibits fluorescences of various colors depending on matrixes by irradiation of ultraviolet rays, the present invention aims at providing a fluorophosphate fluorescent glass exhibiting a strong blue fluorescence.

Up to the present time, no glass has been proposed which is caused to emit white color by mixing phosphors of blue of divalent Eu, green of Tb and red of Mn or Sm in glass, since when a plurality of phosphors are contained, fluorescent intensity is lowered. Thus, the present invention aims at providing a fluorophosphate fluorescent glass exhibiting a strong white fluorescence by combination of the three primary colors in a glass containing blue of divalent Eu, green of Tb and Red of Mn or Sm.

SUMMARY OF THE INVENTION

It is an object of the present invention to provide a fluorophosphate fluorescent glass exhibiting a visible fluorescence, whereby the above described problems of the prior art can be overcome.

It is another object of the present invention to provide a fluorophosphate fluorescent glass exhibiting a strong blue fluorescence.

It is a further object of the present invention to provide a fluorophosphate fluorescent glass exhibiting a strong white fluorescence by combination of the three primary colors in a glass containing blue of divalent Eu, green of Tb and red of Mn or Sm.

These objects can be attained by a fluorophosphate fluorescent glass capable of exhibiting fluorescence in the visible region, having a chemical composition comprising, at least, (I) phosphorus (P), oxygen (O) and fluorine (F), as glass constituting components, and (II) at least one member selected from the group consisting of divalent europium, terbium, samarium and manganese, as a fluorescent agent, the divalent europium being contained as an essential component and at least one of samarium and manganese being contained as an essential component when terbium is contained.

BRIEF DESCRIPTION OF THE DRAWINGS

The accompanying drawings illustrate the principle and merits of the present invention.

DETAILED DESCRIPTION OF THE INVENTION

Figure 1:
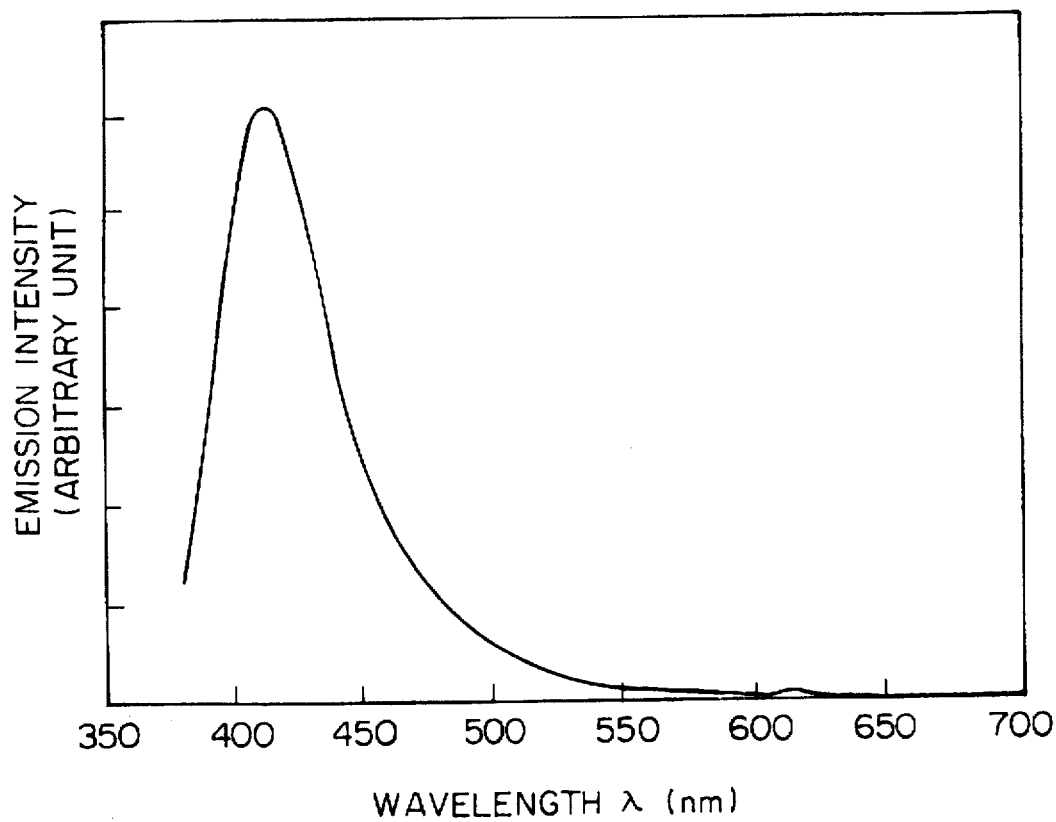
FIG. 1 is a graph showing a fluorescent spectrum of divalent Eu ion when the glass prepared in Example 1 is excited by an ultraviolet ray of 365 nm.

Generally, according to the present invention, there are obtained a fluorophosphate fluorescent glass exhibiting a visible fluorescence, in particular, a fluorescent material comprising a fluorophosphate fluorescent glass containing divalent Eu capable of exhibiting a strong blue fluorescence by irradiating ultraviolet rays and a fluorescent material comprising a fluorophosphate fluorescent glass containing divalent Eu, Tb and Mn or Sm capable of exhibiting a strong white fluorescence by irradiating ultraviolet rays.

That is, according to the present invention, there is provided (1) a fluorophosphate fluorescent glass capable of exhibiting fluorescence in the visible region, having a chemical composition comprising, at least, (I) phosphorus (P), oxygen (O) and fluorine (F), as glass constituting components, and (II) at least one member selected from the group consisting of divalent europium, terbium, samarium and manganese, as a fluorescent agent, the divalent europium being contained as an essential component and at least one of samarium and manganese being contained as an essential component when terbium is contained.

(2) The fluorophosphate fluorescent glass capable of exhibiting fluorescence in the visible region, as described in the above (1), wherein the glass constituting components are represented, in term of atoms for making up the glass, by the following chemical composition (mol %):

P 1 to 15%,

Al 1 to 18%

Mg 0 to 12%,

Ca 0 to 18%

Sr 0.5 to 21%,

Ba 0 to 28%

Zn 0 to 3.5%,

Eu 0.001 to 0.8%,

Ln 0 to 6.5% (Ln: at least one atom selected from Y, La, Gd, Yb, Lu, Dy, Tb and Tm)

Ce 0 to 0.2%

R 0 to 10% (R: at least one atom selected from Li, Na and K),

O 4 to 55%

F 15 to 70% and

Cl 0 to 12% and a blue fluorescence is presented.

(3) The fluorophosphate fluorescent glass capable of exhibiting fluorescence in the visible region, as described in the above (1), wherein the glass constituting components are represented, in term of atoms for making up the glass, by the following chemical composition (mol %):

P 1 to 15%,

Al 1 to 18%

Mg 0 to 12%,

Ca 0 to 18%

Sr 1 to 21%,

Ba 0 to 28%

Zn 0 to 3.5%,

Eu 0.01 to 0.8%,

Tb 0.2 to 4%

Sm 0 to 3%

Mn 0 to 1% (at least one of Sm and Mn being contained)

Ln 0 to 4% (Ln: at least one atom selected from Y, La, Gd, Yb, Lu, Dy and Tm)

Ce 0 to 0.2%

R 0 to 3% (R: at least one atom selected from Li, Na and K),

O 4 to 55%

F 15 to 70% and

Cl 0 to 10% and a white fluorescence is presented.

The reasons for limiting the composition range of each component of this fluorophosphate fluorescent glass capable of exhibiting fluorescence in the visible region, to those described above are as follows:

P is a glass-forming component, which is generally present in a proportion of 1 to 15%, since if less than the lower limit, the glass formation is difficult, while if more than the upper limit, the durability is deteriorated. The preferred range is 1 to 13% in the case of the above described invention (2), and 1 to 12% in the case of the above described invention (3).

Al is a component for increasing the viscosity of the glass and suppressing crystallization, which is generally present in a proportion of 1 to 18%, since if more than the upper limit, the melting property is lowered and the glass is unstable. The preferred range is 2 to 12% in the case of the above described invention (2), and 3 to 10% in the case of the above described invention (3).

Mg, Ca, Sr, Ba and Zn are components for improving the melting property of the glass. If more than the above described ranges, the glass is unstable and tends to be crystallized. The preferred ranges are respectively 0 to 12% of Mg, 0 to 18% of Ca, 0.5 to 21% of Sr, 0 to 28% of Ba and 0 to 3.5% of Zn. The more preferred ranges are respectively 0 to 6% of Mg, 0 to 11% of Ca, 1.5 to 12% of Sr, 0 to 17% of Ba and 0 to 2% of Zn in the case of the above described invention (2) and the more preferred ranges are respectively 0 to 6% of Mg, 0 to 11% of Ca, 1.5 to 12% of Sr, 0 to 17% of Ba and 0 to 2% of Zn in the case of the above described invention (3).

R (at least one atom selected from Li, Na and K) acts to lower the melting temperature of a glass melt, which is generally present in a proportion of 0 to 10%, since if exceeding the above described range, the water resisting property is lowered and the devitrification tendency is increased, thus rendering the glass unstable. The preferred range is 0 to 3%.

Eu is an important component capable of presenting fluorescence in the visible region by ultraviolet excitation, in particular, capable of presenting a blue fluorescence by reducing. This component should be present in a proportion of 0.001 to 0.8%, since if less than the lower limit, sufficient fluorescence cannot be obtained, while if more than the upper limit, the fluorescence is lowered due to concentration quenching. The preferred range of Eu is 0.001 to 0.2% in the case of the above described invention (2) and 0.01 to 0.4% in the case of the above described invention (3).

Tb is an important component capable of presenting a green fluorescence in the visible region by ultraviolet excitation. If more than the above described range, a glass is hardly obtained. The preferred range is 0.2 to 3.5%.

Sm is an important component capable of presenting a red fluorescence in the visible region by ultraviolet excitation. If more than the above described range, a glass is strongly colored. The preferred range is 0 to 2.7%.

Mn is an important component capable of presenting a red fluorescence in the visible region by ultraviolet excitation. If more than the above described range, the fluorescence is weakened. The preferred range is 0 to 0.6%.

In the above described invention (2), Ln (at least one atom selected from Y, La, Gd, Yb, Lu, Dy, Tb and Tm) is a component for increasing the viscosity of the glass and suppressing crystallization. If more than the above described range, the effect thereof is weakened. The preferred range is 0 to 4%.

In the above described invention (3), Ln (at least one atom selected from Y, La, Gd, Yb, Lu, Dy and Tm) is a component for increasing the viscosity of the glass and suppressing crystallization. If more than the above described range, the effect thereof is weakened. The preferred range is 0 to 3%.

Ce is a component acting as a sensitizer of the fluorescent agent, but if exceeding the above described upper limit, this effect is decreased.

F and O are glass-forming components. If the amounts thereof are less than or more than the above described ranges, a glass is hardly obtained. The preferred range of F is 15 to 70% in the above described invention (2) and 25 to 65% in the above described invention (3). The preferred range of O is 4 to 55% in the above described invention (2) and 6 to 40% in the above described invention (3).

Cl is a component for intensifying the emission of divalent Eu. The emission thereof is intensified with increase of the divalent Eu, but the glass is unstable. The preferred range of Cl is 0 to 12% in the case of the above described invention (2) and 0 to 6% in the case of the above described invention (3).

Production of the fluorophosphate fluorescent glass capable of exhibiting fluorescence in the visible region, i.e.

blue fluorescence or white fluorescence according to the present invention is carried out by mixing the corresponding raw material compounds to a proportion of the object composition, for example, aluminum phosphate, strontium fluoride, barium fluoride, europium oxide, terbium oxide, etc., melting the resulting mixture at a temperature of 900° to 1300° C. for 1 to 2 hours in a reducing atmosphere, for example, hydrogen or carbon monoxide or in the presence of a metallic powder, for example, aluminum, zinc, calcium, magnesium, etc. as a reducing agent inert to the glass composition and allowing the mixture to flow out in a metallic mold, followed by shaping.

The features and preferred embodiments of the present invention are described below:

(1) A fluorophosphate fluorescent glass capable of exhibiting fluorescence in the visible region, having a chemical composition comprising, at least, (I) phosphorus (P), oxygen (O) and fluorine (F), as glass constituting components, and (II) at least one member selected from the group consisting of divalent europium, terbium, samarium and manganese, as a fluorescent agent, the divalent europium being contained as an essential component and at least one of samarium and manganese being contained as an essential component when terbium is contained.

(2) The fluorophosphate fluorescent glass capable of exhibiting a blue fluorescence in the visible region, as described above described item (1), having the following chemical composition shown in Table 1 and represented in terms of atoms for making up the glass (mol %):

TABLE 1

| P | 1~13 |
|---|---|
| Al | 2~12 |
| Mg | 0~6 |
| Ca | 0~11 |
| Sr | 1.5~12 |
| Ba | 0~17 |
| Zn | 0~2 |
| R | 0~3.2 |
| Eu | 0.001~0.2 |
| Ln | 0~4 |
| Ce | 0~0.2 |
| O | 4~55 |
| F | 15~70 |
| Cl | 0~12 | wherein R is at least one atom selected from the group consisting of Li, Na and K, and Ln is at least one atom selected from the group consisting of Y, La, Gd, Yb, Lu, Dy, Tb and Tm.

(3) The fluorophosphate fluorescent glass capable of exhibiting a blue fluorescence in the visible region, as described above described item (1), having the following chemical composition shown in Table 2 and represented in terms of atoms for making up the glass (mol %):

TABLE 2

| P | 1.4~4.9 |
|---|---|
| Al | 8.4~11.6 |
| Mg | 0~3.6 |
| Ca | 0~11 |
| Sr | 4.3~6.35 |
| Ba | 0~7.2 |
| Eu | 0.001~0.2 ① |
| Y | 0~3.3 ① |
| La | 0~3.3 ① |

TABLE 2-continued

| Gd | 0~3.3 ① |
|---|---|
| Yb | 0~3.3 ① |
| Lu | 0~3.3 ① |
| Dy | 0~3.3 ① |
| Tb | 0~3.3 ① |
| Tm | 0~3.3 ① |
| Ce | 0~0.2 |
| O | 4.3~17.5 |
| F | 47~66 |
| Cl | 0~12 | wherein the sum of ① = 0.001~3.3%.

(4) The fluorophosphate fluorescent glass capable of exhibiting a white fluorescence in the visible region, as described above described item (1), having the following chemical composition shown in Table 3 and represented in terms of atoms for making up the glass (mol %):

TABLE 3

| P | 1~12 |
|---|---|
| Al | 3~10 |
| Mg | 0~6 |
| Ca | 0~11 |
| Sr | 1.5~12 |
| Ba | 0~17 |
| Zn | 0~2 |
| R | 0~3 |
| Mn | 0~0.6 ① |
| Sm | 0~2.7 ① |
| Tb | 0.2~3.5 |
| Eu | 0.01~0.4 |
| Ln | 0~3 |
| Ce | 0~0.2 |
| O | 6~40 |
| F | 25~65 |
| Cl | 0~6 | wherein R is at least one atom selected from the group consisting of Li, Na and K, Ln is at least one atom selected from the group consisting of Y, La, Gd, Yb, Lu, Dy, Tb and Tm, and either of Sm or Mn of ① or both of them are contained.

(5) The fluorophosphate fluorescent glass capable of exhibiting a white fluorescence in the visible region, as described above described item (1), having the following chemical composition shown in Table 4 and represented in terms of atoms for making up the glass (mol %):

TABLE 4

| P | 1~11 |
|---|---|
| Al | 3~10 |
| Mg | 0~3 |
| Ca | 0~11 |
| Sr | 1.5~7 |
| Ba | 0~9 |
| Zn | 0~1 |
| R | 0~1 |
| Mn | 0~0.6 ① |

TABLE 4-continued

| Sm | 0–2.7 ① |
| --- | --- |
| Tb | 0.2–3.5 |
| Eu | 0.01–0.4 |
| Ln | 0–3 |
| Ce | 0–0.2 |
| O | 6–40 |
| F | 25–65 |
| Cl | 0–6 | wherein R is at least one atom selected from the group consisting of Li, Na and K, Ln is at least one atom selected from the group consisting of Y, La, Gd, Yb, Lu, Dy, Tb and Tm, and either of Sm or Mn of ① or both of them are contained.

EXAMPLES

The present invention will now be illustrated in greater detail by the following examples, but the present invention and merits thereof are not intended to be limited by the materials, compositions and production procedures described in these examples.

(EXAMPLE 1)

Using compounds shown in Table 5 as raw materials, the raw materials were mixed in a proportion by weight as in Sample No. 1, melted at 900° to 1300° C., allowed to flow in a graphite mold and shaped to obtain a glass in stable manner.

The thus prepared glass was excited by an ultraviolet ray of 365 nm to obtain a fluorescent spctrum as shown in FIG. 1. The emission at 410 nm in FIG. 1 was due to divalent Eu ion, which was observed as blue with the naked eye.

(EXAMPLES 2 TO 23)

Glasses were stably obtained by preparing raw materials in proportions by weight shown in Table 5, Sample Nos. 2 to 23 (by mol % of atoms shown in Table 6) and melting the mixture in the similar manner to Example 1.

When the glasses obtained in Examples 2 to 23 were also excited by an ultraviolet ray of 365 nm, there were obtained similar spectra to Example 1, presenting a blue fluorescence.

TABLE 5

(g)

| Raw Material | Sample No. | | | | | | |
| --- | --- | --- | --- | --- | --- | --- | --- |
| | 1 | 2 | 3 | 4 | 5 | 6 | 7 |
| $Al(PO_3)_3$ | 2.7 | 3.0 | 3.0 | 3.0 | 2.6 | 2.6 | 5.0 |
| $Ba(PO_3)_2$ | 2.7 | 3.0 | 3.0 | 3.0 | 2.6 | 2.6 | 5.0 |
| $AlF_3$ | 24.7 | 26.9 | 26.8 | 26.8 | 23 | 23.3 | 31.7 |
| $MgF_2$ | 3.7 | 7.7 | 7.7 | 7.7 | 3.4 | 3.5 | 5.5 |
| $CaF_2$ | 17.7 | 19.2 | 19.1 | 19.1 | 11.8 | 13.3 | 17.5 |
| $SrF_2$ | 25.5 | 27.6 | 27.6 | 27.6 | 20.5 | 21.9 | 21.6 |
| $BaF_2$ | | | | | 14.9 | 7.6 | 11.9 |
| $BaCl_2$ | 22.8 | 12.3 | 12.3 | 12.3 | 21.2 | 25.1 | |
| Al | 0.01 | 0.01 | 0.01 | 0.01 | 0.01 | 0.01 | |
| Zn | | | | | | | 0.08 |
| $Eu_2O_3$ | 0.2 | 0.2 | 0.2 | 0.2 | 0.1 | 0.2 | 0.3 |
| $Y_2O_3$ | | | | | | | |
| $La_2O_3$ | | | | | | | |
| $Gd_2O_3$ | | | | | | | |
| $Yb_2O_3$ | | | | | | | |
| $Dy_2O_3$ | | | | | | | |
| $Tm_2O_3$ | | | | | | | |
| $Tb_2O_3$ | | 0.2 | | | | | |
| $CeO_2$ | | 0.1 | 0.1 | | | | |
| LiF | | | | | | | |
| NaF | | | | | | | 1.0 |
| KF | | | | | | | |

| | Sample No. | | | | | | |
| --- | --- | --- | --- | --- | --- | --- | --- |
| | 8 | 9 | 10 | 11 | 12 | 13 | 14 |
| $Al(PO_3)_3$ | 12.0 | 11.8 | 25.6 | 11.8 | 11.7 | 12 | 12 |
| $Ba(PO_3)_2$ | 1.0 | 1.0 | | 1.0 | 1.0 | 1.0 | 1.0 |
| $AlF_3$ | 18.1 | 17.8 | | 17.8 | 17.5 | 18.0 | 18.0 |
| $MgF_2$ | 3.8 | 3.8 | | 3.7 | 3.6 | 3.7 | 3.7 |
| $CaF_2$ | 10.0 | 9.9 | | 6.9 | 6.8 | 7.0 | 7.0 |
| $SrF_2$ | 20.0 | 19.8 | 20.3 | 19.7 | 19.5 | 20.0 | 19.9 |
| $BaF_2$ | 25.0 | 17.9 | 43.3 | 21.0 | 14.2 | 27.9 | 27.9 |
| $BaCl_2$ | | 8.1 | | 7.9 | 15.5 | | |
| Al | 0.01 | 0.01 | 0.01 | 0.01 | 0.01 | 0.01 | 0.01 |
| Zn | | | | | | | |
| $Eu_2O_3$ | 0.3 | 0.3 | 0.2 | 0.3 | 0.3 | 0.3 | 0.3 |
| $Y_2O_3$ | | | | | | | |
| $La_2O_3$ | | | 10.5 | | | | |
| $Gd_2O_3$ | 9.5 | 9.4 | | 9.8 | 9.7 | 8.3 | 8.3 |
| $Yb_2O_3$ | | | | | | | |

TABLE 5-continued (g)

| Raw Material | | | | | | | |
|---|---|---|---|---|---|---|---|
| Dy$_2$O$_3$ | | | | | | 1.7 | |
| Tm$_2$O$_3$ | | | | | 1.8 | | |
| Tb$_2$O$_3$ | | | | | | | |
| CeO$_2$ | | | | | | | |
| LiF | | | | | | | |
| NaF | 0.2 | 0.2 | | 0.2 | 0.2 | 0.2 | 0.2 |
| KF | | | | | | | |

| | Sample No. | | | | | | | | |
|---|---|---|---|---|---|---|---|---|---|
| | 15 | 16 | 17 | 18 | 19 | 20 | 21 | 22 | 23 |
| Al(PO$_3$)$_3$ | 28.9 | 28.6 | 28.4 | 28.3 | 28.0 | 26.3 | 12.4 | 28.2 | 8.4 |
| Ba(PO$_3$)$_2$ | | | | | | | 1.0 | | |
| AlF$_3$ | | | | | | | 18.7 | | 28.4 |
| MgF$_2$ | | | | 3.7 | | | 3.9 | | 3.3 |
| CaF$_2$ | | | | | 4.6 | | 7.3 | | 33.0 |
| SrF$_2$ | 22.9 | 22.7 | 22.5 | 22.5 | 22.2 | 20.9 | 20.7 | 22.3 | 26.6 |
| BaF$_2$ | 42.7 | 42.3 | 41.9 | 41.8 | 41.4 | 38.8 | 29.0 | 41.6 | |
| BaCl$_2$ | | | | | | 12.9 | | | |
| Al | | | | | | | 0.01 | | |
| Zn | 0.1 | 0.1 | 0.1 | 0.1 | 0.1 | 0.1 | | 0.2 | |
| Eu$_{23}$ | 1.1 | 1.1 | 1.1 | 1.0 | 1.0 | 1.0 | 0.3 | 2.1 | 0.4 |
| Y$_2$O$_3$ | | | | | | | 6.4 | | |
| La$_2$O$_3$ | | | | | | | | | |
| Gd$_2$O$_3$ | 2.6 | 2.6 | 2.6 | 2.6 | 2.6 | | | | |
| Yb$_2$O$_3$ | | | | | | | | | |
| Dy$_2$O$_3$ | | | | | | | | | |
| Tm$_2$O$_3$ | | | | | | | | 2.3 | |
| Tb$_2$O$_3$ | | | | | | | | | |
| CeO$_2$ | | | | | | | | | |
| LiF | 1.6 | | | | | | | | |
| NaF | | 2.5 | | | | | 0.2 | | |
| KF | | | 3.5 | | | | | 3.3 | |
| | | | | | | | | | 35 |

TABLE 6

(mol %)

Glass Compisition (atom)

| | Sample No. | | | | | | |
|---|---|---|---|---|---|---|---|
| | 1 | 2 | 3 | 4 | 5 | 6 | 7 |
| P | 1.6 | 1.6 | 1.6 | 1.6 | 1.6 | 1.6 | 2.5 |
| Al | 9.6 | 9.6 | 9.6 | 9.6 | 9.6 | 9.6 | 10.9 |
| Mg | 1.8 | 3.6 | 3.6 | 3.6 | 1.8 | 1.8 | 2.4 |
| Ca | 7.1 | 7.1 | 7.1 | 7.1 | 5.1 | 5.7 | 6.2 |
| Sr | 6.4 | 6.4 | 6.4 | 6.3 | 5.5 | 5.8 | 4.7 |
| Ba | 3.7 | 2.0 | 2.0 | 2.0 | 6.6 | 5.7 | 2.4 |
| Zn | | | | | | | 0.01 |
| Li | | | | | | | |
| Na | | | | | | | 0.7 |
| K | | | | | | | |
| Eu | 0.01 | 0.01 | 0.01 | 0.01 | 0.01 | 0.01 | 0.03 |
| Y | | | | | | | |
| La | | | | | | | |
| Gd | | | | | | | |
| Yb | | | | 0.06 | | | |
| Dy | | | | | | | |
| Tm | | | | | | | |
| Tb | | | 0.03 | | | | |
| Ce | | 0.01 | 0.01 | | | | |
| O | 4.7 | 4.8 | 4.8 | 4.8 | 4.7 | 4.7 | 7.6 |
| F | 58.3 | 61.7 | 61.6 | 61.6 | 58.3 | 57.1 | 62.5 |
| Cl | 6.9 | 3.4 | 3.4 | 3.4 | 6.9 | 8.0 | |

TABLE 6-continued (mol %)

Glass Com-
pisition (atom)

| | Sample No. | | | | | | |
|---|---|---|---|---|---|---|---|
| | 8 | 9 | 10 | 11 | 12 | 13 | 14 |
| P | 4.6 | 4.6 | 11.0 | 4.7 | 4.7 | 4.7 | 4.7 |
| Al | 8.4 | 8.6 | 3.7 | 8.6 | 8.6 | 8.6 | 8.6 |
| Mg | 2.0 | 2.0 | | 2.0 | 2.0 | 2.0 | 2.0 |
| Ca | 4.1 | 4.1 | | 3.0 | 3.0 | 3.0 | 3.0 |
| Sr | 5.1 | 5.1 | 6.1 | 5.2 | 5.2 | 5.2 | 5.2 |
| Ba | 4.7 | 4.7 | 9.3 | 5.4 | 5.4 | 5.4 | 5.4 |
| Zn | | | | | | | |
| Li | | | | | | | |
| Na | 0.2 | 0.2 | | 0.2 | 0.2 | 0.2 | 0.2 |
| K | | | | | | | |
| Eu | 0.03 | 0.03 | 0.02 | 0.03 | 0.03 | 0.03 | 0.03 |
| Y | | | | | | | |
| La | | | 2.4 | | | | |
| Gd | 1.7 | 1.7 | | 1.8 | 1.8 | 1.5 | 1.5 |
| Yb | | | | | | | |
| Dy | | | | | | | 0.3 |
| Tm | | | | | | 0.3 | |
| Tb | | | | | | | |
| Ce | | | | | | | |
| O | 16.5 | 16.5 | 36.6 | 16.9 | 16.9 | 16.9 | 16.9 |
| F | 52.6 | 50.0 | 30.8 | 49.7 | 47.2 | 52.2 | 52.2 |
| Cl | | 2.5 | | 2.5 | 5.0 | | |

| | Sample No. | | | | | | | | |
|---|---|---|---|---|---|---|---|---|---|
| | 15 | 16 | 17 | 18 | 19 | 20 | 21 | 22 | 23 |
| P | 11.4 | 11.4 | 11.4 | 11.2 | 11.2 | 11.3 | 4.7 | 11.4 | 2.5 |
| Al | 3.8 | 3.8 | 3.8 | 3.7 | 3.7 | 3.8 | 8.6 | 3.8 | 9.7 |
| Mg | | | | 2.1 | | | 2.0 | | 1.4 |
| Ca | | | | | 2.1 | | 3.0 | | 11 |
| Sr | 6.4 | 6.4 | 6.4 | 6.2 | 6.2 | 6.3 | 5.2 | 6.3 | 5.5 |
| Ba | 8.5 | 8.5 | 8.5 | 8.3 | 8.3 | 10.7 | 5.4 | 8.5 | |
| Zn | 0.06 | 0.06 | 0.06 | 0.06 | 0.06 | 0.06 | | 0.1 | |
| Li | 2.1 | | | | | | | | |
| Na | | 2.1 | | | | | 0.2 | | |
| K | | | 2.1 | | | | | 2.1 | |
| Eu | 0.1 | 0.1 | 0.1 | 0.1 | 0.1 | 0.1 | 0.03 | 0.2 | 0.6 |
| Y | | | | | | | 1.8 | | |
| La | | | | | | | | | |
| Gd | 0.5 | 0.5 | 0.5 | 0.5 | 0.5 | | | | |
| Yb | | | | | | | | | |
| Dy | | | | | | | | | |
| Tm | | | | | | | | 0.42 | |
| Tb | | | | | | | | | |
| Ce | | | | | | | | | |
| O | 35.4 | 35.4 | 35.4 | 34.6 | 34.6 | 34.1 | 16.9 | 35.5 | 7.5 |
| F | 31.8 | 31.8 | 31.8 | 33.2 | 33.2 | 29.2 | 52.2 | 31.7 | 62.3 |
| Cl | | | | | | 4.7 | | | |

COMPARATIVE EXAMPLE

Raw materials were mixed in a proportion by weight, calculated from a glass composition of the prior art, i.e. 75% of $B_2O_3$, 12% of $Na_2O$, 4% of SrO, 4% of $Al_2O_3$, 1% of $La_2O_3$, 0.125% of $Eu_2O_3$ and 0.1% of C, melted at 1100° C., allowed to flow out into a graphite mold and shaped to obtain a glass.

When the thus prepared glass was excited by an ultraviolet ray of 365 nm and subjected to measurement of its fluorescence spectrum, there was obtained a similar spectrum to Example 1, presenting a light violet fluorescence. However, the emission intensity was 1/10 times as large as that of Example 1, even taking the highest peak at 410 nm.

(EXAMPLE 24)

Using compounds shown in Table 7 as raw materials so as to give a composition shown in Table 8, the raw materials were mixed in a proportion by weight as in Sample No. 24, melted at 900° to 1300° C. for 1 to 2 hours in a reducing atmosphere, for example, hydrogen or carbon monoxide, or in the presence of a metallic powder, for example, aluminum or zinc as a reducing agent inert to the glass compositions in nitrogen atmosphere, allowed to flow in a graphite mold and shaped to obtain a glass in stable manner.

Figure 2:
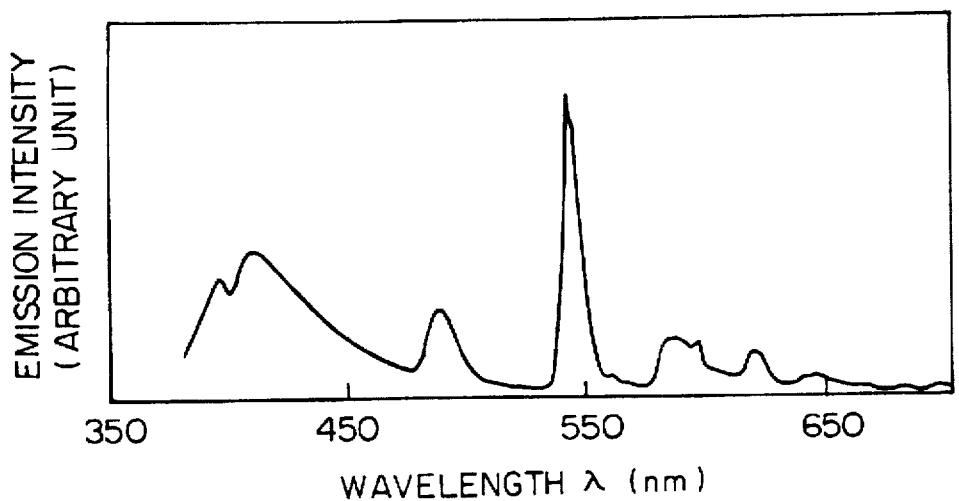
FIG. 2 is a graph showing a fluorescent spectrum when the glass prepared in Example 24 is excited by an ultraviolet ray of 365 nm.

When the thus prepared glass was excited by an ultraviolet ray of 365 nm, a white fluorescence was exhibited to give a fluorescent spctrum as shown in FIG. 2.

(EXAMPLES 25 TO 30)

Glasses were stably obtained by preparing raw materials in proportions by weight shown in Table 7, Sample Nos. 25 to 30 and melting the mixture in the similar manner to Example 24.

When the glasses obtained in Examples 25 to 30 were also excited by an ultraviolet ray of 365 nm, there were obtained similar spectra to Example 24, presenting a white fluorescence.

(EXAMPLE 31)

Using compounds shown in Table 7 as raw materials so as to give a composition shown in Table 8, the raw materials were mixed in a proportion by weight as in Sample No. 31, melted at 900° to 1300° C. for 1 to 2 hours in a reducing atmosphere, for example, hydrogen or carbon monoxide, or in the presence of a metallic powder, for example, aluminum or zinc as a reducing agent inert to the glass compositions in nitrogen atmosphere, allowed to flow in a graphite mold and shaped to obtain a glass in stable manner.

Figure 3:
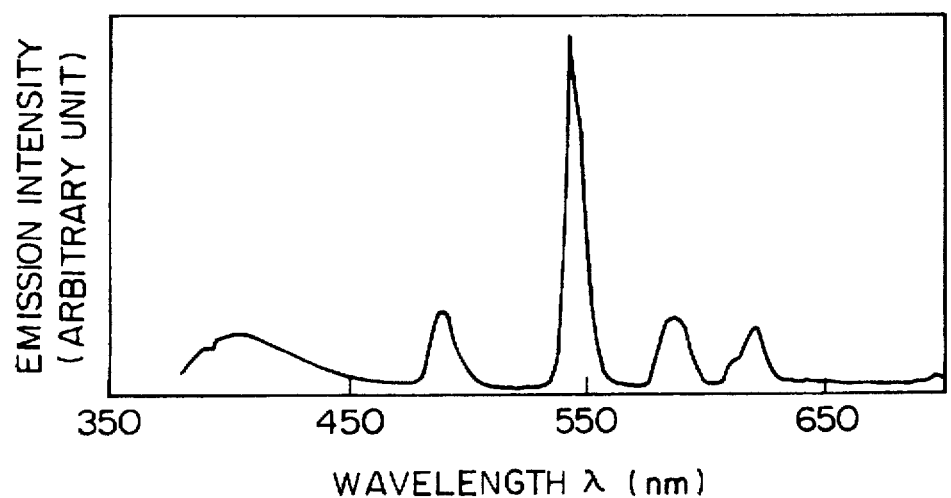
FIG. 3 is a graph showing a fluorescent spectrum when the glass prepared in Example 31 is excited by an ultraviolet ray of 365 nm.

When the thus prepared glass was excited by an ultraviolet ray of 365 nm, a white fluorescence was exhibited to give a fluorescent spectrum as shown in FIG. 3.

(EXAMPLES 32 TO 38)

Glasses were stably obtained by preparing raw materials in proportions by weight shown in Table 7, Sample Nos. 32 to 38 and melting the mixture in the similar manner to Example 31.

When the glasses obtained in Examples 32 to 38 were also excited by an ultraviolet ray of 365 nm, there were obtained similar spectra to Example 31, presenting a white fluorescence.

TABLE 7

(g)

| Raw Material | Sample No. | | | | | | |
|---|---|---|---|---|---|---|---|
| | 24 | 25 | 26 | 27 | 28 | 29 | 30 |
| $Al(PO_3)_3$ | 7.5 | 24.9 | 25.0 | 25.2 | 8.2 | 6.1 | 13.4 |
| $AlF_3$ | 23.3 | | | | 27.8 | 26.1 | 17.9 |
| $MgF_2$ | 3.6 | | | | 3.2 | 3.6 | 3.3 |
| $CaF_2$ | 19.0 | | | | 31.5 | 22.0 | 7.1 |
| $SrF_2$ | 25.0 | 20.0 | 20.1 | 20.2 | 26.0 | 26.8 | 20.1 |
| $BaF_2$ | | 40.0 | 40.3 | 39.9 | | 13.6 | 28.0 |
| $BaCl_2$ | 15.0 | | | | | | |
| $MnO_2$ | | | | | | | |
| $Sm_2O_3$ | 0.4 | 0.2 | 12.5 | 0.4 | 0.7 | 0.3 | 1.3 |
| $Tb_2O_3$ | 6.0 | 14.7 | 1.9 | 1.0 | 2.3 | 1.1 | 8.3 |
| $Eu_2O_3$ | 0.2 | 0.2 | 0.2 | 1.9 | 0.4 | 0.3 | 0.3 |
| $Gd_2O_3$ | | | | 10.9 | | | |
| $CeO_2$ | | | | 0.5 | | | |
| Zn | | | | | | | |
| Al | | 0.01 | 0.01 | 0.10 | 0.03 | 0.03 | 0.02 |
| KF | | | | | | | 0.2 |

| Raw Material | Sample No. | | | | | | | |
|---|---|---|---|---|---|---|---|---|
| | 31 | 32 | 33 | 34 | 35 | 36 | 37 | 38 |
| $Al(PO_3)_3$ | 7.1 | 9.4 | 9.4 | 9.4 | 25.4 | 26.8 | 7.4 | 8.0 |
| $AlF_3$ | 23.3 | 23.9 | 23.9 | 23.9 | | 24.3 | 27.1 | |
| $MgF_2$ | 3.6 | 2.8 | 2.8 | 2.8 | | | 3.8 | 6.3 |
| $CaF_2$ | 18.9 | 19.8 | 19.7 | 19.7 | | | 19.7 | 30.0 |
| $SrF_2$ | 24.8 | 22.3 | 22.3 | 22.3 | 20.4 | 21.5 | 25.8 | 6.3 |
| $BaF_2$ | | | | | 40.2 | 42.5 | 11.0 | 17.7 |

TABLE 7-continued (g)

| Raw Material | | | | | | | | |
|---|---|---|---|---|---|---|---|---|
| $BaCl_2$ | 14.9 | 14.8 | 14.8 | 14.8 | | | | |
| $MnO_2$ | 0.1 | 0.1 | 0.2 | 0.2 | 0.5 | 1.5 | 0.8 | 0.4 |
| $Sm_2O_3$ | | | | | | | | |
| $Tb_2O_3$ | 6.9 | 6.5 | 6.5 | 6.5 | 13.3 | 7.2 | 6.8 | 3.7 |
| $Eu_2O_3$ | 0.3 | 0.3 | 0.3 | 0.3 | 0.2 | 0.2 | 0.3 | 0.4 |
| $Gd_2O_3$ | | | | | | | | |
| $CeO_2$ | | | | | | | | |
| Zn | 0.1 | 0.1 | 0.2 | | | | | |
| Al | | | | 0.07 | 0.10 | 0.30 | 0.18 | 0.14 |
| KF | | | | | | | | |

TABLE 8

(mol %)

Glass Composition (atom)

| | Sample No. | | | | | | |
|---|---|---|---|---|---|---|---|
| | 24 | 25 | 26 | 27 | 28 | 29 | 30 |
| P | 2.6 | 10.9 | 10.9 | 10.9 | 2.5 | 2.0 | 5.0 |
| Al | 9.3 | 3.7 | 3.7 | 3.8 | 9.7 | 9.7 | 8.7 |
| Mg | 1.8 | | | | 1.4 | 1.7 | 1.7 |
| Ca | 7.4 | | | | 10.7 | 8.1 | 3.0 |
| Sr | 6.1 | 6.1 | 6.1 | 6.2 | 5.5 | 6.2 | 5.2 |
| Ba | 2.2 | 8.8 | 8.8 | 8.7 | | 2.2 | 5.2 |
| Zn | | | | | | | |
| Na | | | | | | | 0.1 |
| Mn | | | | | | | |
| Sm | 0.07 | 0.04 | 2.74 | 0.08 | 0.11 | 0.06 | 0.25 |
| Tb | 1.0 | 3.1 | 0.4 | 0.2 | 0.3 | 0.2 | 1.5 |
| Eu | 0.03 | 0.04 | 0.04 | 0.41 | 0.06 | 0.06 | 0.05 |
| Gd | | | | 2.3 | | | |
| Ce | | | | 0.1 | | | |
| O | 9.4 | 37.5 | 37.5 | 37.5 | 8.2 | 6.5 | 17.7 |
| F | 55.8 | 29.9 | 29.9 | 29.8 | 61.6 | 63.3 | 51.5 |
| Cl | 4.4 | | | | | | |

| | Sample No. | | | | | | | |
|---|---|---|---|---|---|---|---|---|
| | 31 | 32 | 33 | 34 | 35 | 36 | 37 | 38 |
| P | 2.5 | 3.2 | 3.2 | 3.2 | 11.0 | 11.2 | 2.5 | 2.5 |
| Al | 9.3 | 9.6 | 9.6 | 9.7 | 3.8 | 4.1 | 9.5 | 9.8 |
| Mg | 1.8 | 1.3 | 1.3 | 1.3 | | | 1.8 | 2.8 |
| Ca | 7.4 | 7.6 | 7.6 | 7.6 | | | 7.4 | 10.5 |
| Sr | 6.0 | 5.3 | 5.3 | 5.3 | 6.2 | 6.3 | 6.0 | 1.4 |
| Ba | 2.2 | 2.1 | 2.1 | 2.1 | 8.7 | 8.9 | 1.8 | 2.8 |
| Zn | 0.1 | 0.1 | 0.1 | | | | | |
| Na | | | | | | | | |
| Mn | 0.03 | 0.03 | 0.05 | 0.05 | 0.20 | 0.62 | 0.27 | 0.11 |
| Sm | | | | | | | | |
| Tb | 1.2 | 1.1 | 1.1 | 1.1 | 2.8 | 1.4 | 1.1 | 0.6 |
| Eu | 0.05 | 0.05 | 0.05 | 0.05 | 0.04 | 0.04 | 0.05 | 0.06 |
| Gd | | | | | | | | |
| Ce | | | | | | | | |
| O | 9.3 | 11.3 | 11.4 | 11.4 | 37.5 | 37.0 | 9.7 | 8.6 |
| F | 55.9 | 54.1 | 54.0 | 54.0 | 29.8 | 30.4 | 59.8 | 61.1 |
| Cl | 4.4 | 4.3 | 4.3 | 4.3 | | | | |

ADVANTAGES OF THE INVENTION

The fluorescent glass of the present invention is capable of converting invisible ultraviolet rays into visually observable visible rays with a high efficiency and available for controlling the optical axis of a laser beam such as excimer laser, etc. Furthermore, according to the present invention, there can be provided a fluorophosphate fluorescent glass exhibiting a strong blue fluorescence, which is applicable to fluorescent displaying of full color in combination with a green or red fluorescent glass or a fluorophosphate fluorescent glass exhibiting white fluorescence, which can be utilized for displaying devices and backlights of LCD.

What is claimed is:

1. A fluorophosphate fluorescent glass capable of exhibiting blue fluorescence in the visible region by ultraviolet excitation, having a chemical composition comprising, at least, phosphorus (P), oxygen (O) and fluorine (F), as glass constituting components, and divalent europium, as a fluorescent agent.

2. The fluorophosphate fluorescent glass capable of exhibiting fluorescence in the visible region, as claimed in claim 1, wherein the glass constituting components are represented, in term of atoms for making up the glass, by the following chemical composition (mol %):

P 1 to 15%,
Al 1 to 18%
Mg 0 to 12%,
Ca 0 to 18%
Sr 0.5 to 21%,
Ba 0 to 28%
Zn 0 to 3.5%,
Eu 0.001 to 0.8%,
Ln 0 to 6.5% (Ln: at least one atom selected from Y, La, Gd, Yb, Lu, Dy, Tb and Tm)
Ce 0 to 0.2%
R 0 to 10% (R: at least one atom selected from Li, Na and K),
O 4 to 55%
F 15 to 70% and
Cl 0 to 12%
and a blue fluorescence is presented.

3. The fluorophosphate fluorescent glass capable of exhibiting a blue fluorescence in the visible region, as claimed in claim 2, wherein the glass constituting components are represented, in term of atoms for making up the glass, by the following chemical composition (mol %):

P 1 to 13%
Al 2 to 12%
Mg 0 to 6%
Ca 0 to 11%
Sr 1.5 to 12%
Ba 0 to 17%
Zn 0 to 2%
R 0 to 3.2%
Eu 0.001 to 0.2%
Ln 0 to 4%
Ce 0 to 0.2%
O 4 to 55%
F 15 to 70% and
Cl 0 to 12%
wherein R is at least one atom selected from the group consisting of Li, Na and K, and Ln is at least one atom selected from the group consisting of Y, La, Gd, Yb, Lu, Dy, Tb and Tm.

4. The fluorophosphate fluorescent glass capable of exhibiting a blue fluorescence in the visible region, as claimed in claim 2, wherein the glass constituting components are represented, in term of atoms for making up the glass, by the following chemical composition (mol %):

P 1.4 to 4.9

Al 8.4 to 11.6
Mg 0 to 3.6
Ca 0 to 11
Sr 4.3 to 6.35
Ba 0 to 7.2
Eu 0.001 to 0.2 ①
Y 0 to 3.3 ①
La 0 to 3.3 ①
Gd 0 to 3.3 ①
Yb 0 to 3.3 ①
Lu 0 to 3.3 ①
Dy 0 to 3.3 ①
Tb 0 to 3.3 ①
Tm 0 to 3.3 ①
Ce 0 to 0.2
O 4.3 to 17.5
F 47 to 66 and
Cl 0 to 12
wherein the sum of ①=0.001–3.3%.

5. A fluorophosphate fluorescent glass capable of exhibiting fluorescence in the visible region, having a chemical composition comprising, at least, phosphorus (P), oxygen (O) and fluorine (F), as glass constituting components, and divalent europium, as a fluorescent agent, and at least one member selected from the group consisting of terbium, samarium and manganese, as a further fluorescent agent, at least one of samarium and manganese being contained as an essential component when terbium is contained.

6. The fluorophosphate fluorescent glass capable of exhibiting fluorescence in the visible region, as claimed in claim 5, wherein the glass constituting components are represented, in term of atoms for making up the glass, by the following chemical composition (mol %):

P 1 to 15%,
Al 1 to 18%
Mg 0 to 12%,
Ca 0 to 18%
Sr 1 to 21%,
Ba 0 to 28%
Zn 0 to 3.5%,
Eu 0.01 to 0.8%,
Tb 0.2 to 4%
Sm 0 to 3%
Mn 0 to 1% (at least one of Sm and Mn being contained)
Ln 0 to 4% (Ln: at least one atom selected from Y, La, Gd, Yb, Lu, Dy and Tm)
Ce 0 to 0.2%
R 0 to 3% (R: at least one atom selected from Li, Na and K),
O 4 to 55%
F 15 to 70% and
Cl 0 to 10%
and a white fluorescence is presented.

7. The fluorophosphate fluorescent glass capable of exhibiting a white fluorescence in the visible region, as claimed in claim 6, wherein the glass constituting components are represented, in term of atoms for making up the glass, by the following chemical composition (mol %):

P 1 to 12
Al 3 to 10

Mg 0 to 6
Ca 0 to 11
Sr 1.5 to 12
Ba 0 to 17
Zn 0 to 2
R 0 to 3
Mn 0 to 0.6 ①
Sm 0 to 2.7 ①
Tb 0.2 to 3.5
Eu 0.01 to 0.4
Ln 0 to 3
Ce 0 to 0.2
O 6 to 40
F 25 to 65 and
Cl 0 to 6 wherein R is at least one atom selected from the group consisting of Li, Na and K, Ln is at least one atom selected from the group consisting of Y, La, Gd, Yb, Lu, Dy and Tm, and either of Sm or Mn of ① or both of them are contained.

8. The fluorophosphate fluorescent glass capable of exhibiting a white fluorescence in the visible region, as claimed in claim 6, wherein the glass constituting components are represented, in term of atoms for making up the glass, by the following chemical composition (mol %):

P 1 to 11
Al 3 to 10
Mg 0 to 3
Ca 0 to 11
Sr 1.5 to 7
Ba 0 to 9
Zn 0 to 1
R 0 to 1
Mn 0 to 0.6 ①
Sm 0 to 2.7 ①
Tb 0.2 to 3.5
Eu 0.01 to 0.4
Ln 0 to 3
Ce 0 to 0.2
O 6 to 40
F 25 to 65 and
Cl 0 to 6 wherein R is at least one atom selected from the group consisting of Li, Na and K, Ln is at least one atom selected from the group consisting of Y, La, Gd, Yb, Lu, Dy and Tm, and either of Sm or Mn of ① or both of them are contained.

* * * * *